*2,782,206*
2,2-DIMETHYL-α,α-DIPHENYL-1-PYRROLIDENE-ALKANOAMIDES

Brooke D. Aspergren, Kalamazoo, Richard V. Heinzelman, Kalamazoo Township, Kalamazoo County, and Robert B. Moffett, Kalamazoo, Mich., assignors to The Upjohn Company, Kalamazoo, Mich., a corporation of Michigan No Drawing. Application October 21, 1953,
Serial No. 387,513

8 Claims. (Cl. 260—313)

This invention relates to new compounds and is particularly directed to 2,2-dimethyl-α,α-diphenyl-1-pyrrolidinealkanoamides, the corresponding alkanonitriles, and the non-toxic acid addition and quaternary salts thereof.

The novel compounds of the invention are represented by the formula:

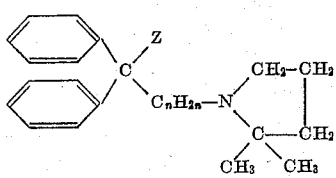

in which $n$ is an integer from one to six and Z is selected from the class consisting of the cyano group, —CN, and the carbamyl group,

It is an object of the invention to provide as new compounds 2,2 - dimethyl-α,α-diphenyl-1-pyrrolidinealkanoamides, the corresponding alkanonitriles, and free bases the non-toxic quaternary and acid addition salts thereof. Other objects of the invention will be apparent to those skilled in the art to which this invention pertains.

The compounds of the invention are useful as intermediates and as antisecretory agents. Thus the nitriles are useful as intermediates in the preparation of the corresponding amides and the amides are particularly of value as antisecretory agents. Generally speaking, the amides and salts of the invention are solids and the nitriles are high-boiling liquids.

The novel compounds of the invention are prepared by the procedures set forth in Cheney et al., J. Org. Chem. 17, 770–777 (1952); Bockmühl et al., Ann. 561, 52–85 (1948); German patent 731,560; and Walton et al., J. Chem. Soc. 1949, 648–655. 2,2-Dimethylpyrrolidine is prepared according to the procedure of Moffett and White, J. Org. Chem. 17, 407–413 (1952), and coupled with diphenylacetonitrile by a $C_nH_{2n}$ group to form the nitriles of the invention. The coupling can be effected by mixing 2,2-dimethylpyrrolidine with halohydrins to form 2,2-dimethyl-1-pyrrolidinealkanols, then with thionyl halide to form 2,2-dimethyl-1-pyrrolidinealkyl halides. The obtained halides are then condensed with diphenylacetonitrile by means of a basic catalyst such as lithium and sodium amides, sodium alkoxides, and sodium or powdered sodium hydroxide to form nitriles of the invention in which $n$ is greater than one. Alternatively, the 2,2-dimethyl-1-pyrrolidinealkanols can be prepared using procedures such as those described by Moffett, J. Org. Chem. 14, 862–867 (1949). When the $C_nH_{2n}$ group of the intermediate compounds is such that the corresponding group of the final product, i. e., nitrile, is of straight-chain or symmetrical branched-chain configuration, a single nitrile is obtained. For example, with ethylene chlorohydrin (or ethylene bromohydrin) there is obtained 2,2-dimethyl-α,α-diphenyl-1-pyrrolidinebutyronitrile; with trimethylene chlorohydrin, 2,2-dimethyl-α,α-diphenyl-1-pyrrolidinevaleronitrile; and with 3-chloro-2-butanol, α,α - diphenyl-β,γ,2,2-tetramethyl-1-pyrrolidinebutyronitrile. When the $C_nH_{2n}$ group of the intermediate compounds is such that the corresponding group of the final product has an unsymmetrical branched-chain configuration, rearrangement can occur during the aforesaid alkanol-thionyl chloride and/or alkyl chloride-diphenylacetonitrile reactions. Ordinarily, therefore, the final product consists of a mixture of isomers. For example, with either α-propylene chlorohydrin or β-propylene chlorohydrin there is obtained a mixture of α,α-diphenyl-β,2,2-trimethyl - 1 - pyrrolidinebutyronitrile and α,α-diphenyl-γ,2,2-trimethyl-1-pyrrolidinebutyronitrile. Such mixtures can be employed directly for reaction purposes, or if desired, can be separated by conventional means, e. g., fractional crystallization. Thus a pure nitrile can be hydrolyzed to the corresponding amide, or a mixture of nitriles to a corresponding mixture of amides, which amide mixture can be separated as noted in the case of the nitriles.

The coupling can also be effected using an alkylene dihalide. Thus diphenylacetonitrile can be reacted with an alkylene dihalide to give an α,α-diphenylhaloalkanonitrile which is then condensed with 2,2-dimethylpyrrolidine to give the desired nitrile according to the invention. For example, with tetramethylene dichloride there is obtained 2,2-dimethyl-α,α-diphenyl-1-pyrrolidinecapronitrile; with pentamethylene dichloride, 2,2 - dimethyl-α,α-diphenyl-1-pyrrolidineënanthonitrile; and with hexamethylene dichloride, 2,2-dimethyl-α,α-diphenyl-1-pyrrolidinecaprylonitrile. When $n$ is one, the coupling is advantageously effected by the Mannich reaction. Thus 2,2-dimethylpyrrolidine, formaldehyde, and diphenylacetonitrile, on prolonged heating in a solvent such as ethanol, condense to form the nitrile according to the invention in which $n$ is one. The desired amides are conveniently obtained by acid hydrolysis or by hydrolysis in alcoholic potassium hydroxide of the corresponding nitriles.

It is known that α,α-diphenyl-1-pyrrolidinealkanoamides and the corresponding 1-piperidine and 2-methyl-1-piperidine analogues have antispasmodic properties; see Bockmühl et al., supra, and Cheney et al., supra. These pyrrolidine and piperidine analogues of the compounds of the invention, however, are markedly inferior antisecretory agents as compared with the compounds of the invention, as is illustrated in Table 1, wherein the antisecretory activities of the methobromides of α,α-diphenyl-1-pyrrolidinebutyramide (A), α,α-diphenyl-1-piperidinebutyramide (B), α,α - diphenyl - 2-methyl-1-piperidinebutyramide (C), and 2,2-dimethyl-α,α-diphenyl-1-pyrrolidinebutyramide (D) are compared. These data were obtained by determining the ED$_{50}$ of the respective compounds (effective dose for causing fifty percent inhibition of the volume of gastric secretion), using pyloric ligation rats as test animals. Aqueous solutions of varying concentrations of the compounds were administered intravenously immediately after pyloric ligation under ether anesthesia, and the volumes of secretion were determined two hours later. Such volumes were compared with volumes of gastric secretion determined in pyloric ligation rats to which no drugs were administered. The foregoing procedure is the same as that described by Visscher and Tazelaar, Amer. J. Physiology 167, 833 (1951), except for the omission of intragastric injection of air at the time of pyloric ligation.

TABLE 1

| Compound: | ED$_{50}$ micrograms/kilograms |
|---|---|
| A (pyrrolidine) | 200 |
| B (piperidine) | 100 |
| C (2-methylpiperidine) | 200 |
| D (2,2-dimethylpyrrolidine) | 3 |

From these data it will be seen that the antisecretory activity of 2,2-dimethyl-α,α-diphenyl-1-pyrrolidinebutyramide is about thirty to sixty times that of the most closely related prior art compounds.

The invention may now be more fully understood by referring to the following preparations and examples which are illustrative of the products of the present invention and their preparation, but are not to be construed as limiting. Unless otherwise specified, the parts are by weight.

PREPARATION 1.—2-(2,2-DIMETHYL-1-PYRROLIDYL)ETHYL CHLORIDE

Hydrogen chloride gas was passed into a cooled solution of 114.4 grams (0.8 mole) of 2-(2,2-dimethyl-1-pyrrolidyl)ethanol (Moffett and White, supra) in 400 mils of dry benzene until strongly acid. Then 71.8 mils (1.0 mole) of thionyl chloride was added slowly with cooling in an ice-water bath. When the addition was complete the solution was heated on a steam-bath for two hours during which time hydrogen chloride and sulfur dioxide were evolved. The chloride hydrochloride crystallized and, after cooling, was collected and washed first with benzene, then with absolute ether, and dried giving a 96 percent yield of nearly white crystals, M. P. 201–202 degrees centigrade. To form the free base, 99 grams of the hydrochloride was treated with 100 mils of forty percent aqueous sodium hydroxide, the free base extracted with 500 mils of toluene, and the toluene solution dried over anhydrous potassium carbonate. There was thus obtained a toluene solution containing about 0.5 mole of 2-(2,2-dimethyl-1-pyrrolidyl)ethyl chloride in 500 mils of toluene.

Example 1.—2,2-dimethyl - α,α - diphenyl - 1-pyrrolidinebutyronitrile hydrochloride In a three-liter, three-neck, round-bottom flask equipped with stirrer and reflux condenser, 14.0 grams (0.61 mole) of lithium amide was slurried with 900 mils of dry toluene; 98.6 grams (0.51 mole) of α,α-diphenylacetonitrile was added in small portions and the mixture was heated under reflux for four hours. A solution of 82.5 grams (0.51 mole) of 2-(2,2-dimethyl-1-pyrrolidyl)ethyl chloride in 500 mils of toluene was rapidly added dropwise to the hot, red slurry and heating under reflux continued for eighteen hours. About 400 mils of water was cautiously added, the mixture vigorously stirred, and the aqueous layer discarded. Concentrated hydrochloric acid (1.1 moles) in 300 mils of water was then added and the hydrochloride of 2,2-dimethyl-α,α-diphenyl-1-pyrrolidinebutyronitrile precipitated out. The precipitate was filtered off and recrystallized from isopropanol and then from methyl ethyl ketone containing a few drops of ethanol. The recrystallized 2,2-dimethyl-α-αdiphenyl-1-pyrrolidinebutyronitrile hydrochloride had a melting point of 209–211 degrees centigrade and the following analysis:

Calculated for $C_{22}H_{27}ClN_2$: C, 74.45; H, 7.64; N, 7.89; Cl, 9.99. Found: C, 74.70; H, 7.98; N, 8.09; Cl, 9.69.

Following the procedure of this example using other (2,2-dimethyl-1-pyrrolidyl)alkanols there are obtained other nitriles, such as, α,α-diphenyl-γ,2,2-trimethyl-1-pyrrolidinebutyronitrile, α,α-diphenyl-β,2,2-trimethyl-1-pyrrolidinebutyronitrile, 2,2-dimethyl-α,α-diphenyl-1-pyrrolidinecapronitrile, 2,2-dimethyl-α,α-diphenyl-1-pyrrolidinevaleronitrile, 2,2 - dimethyl - α,α - diphenyl-1-pyrrolidineënanthonitrile, 2,2-dimethyl-α,α-diphenyl-1-pyrrolidinecaprylonitrile, and the like.

Example 2.—2,2 - dimethyl - α,α - diphenyl - 1 - pyrrolidinebutyramide

In a 500-mil, three-neck flask, 126 mils of concentrated sulfuric acid was added to 12.6 mils of cooled water and 71 grams (0.20 mole) of 2,2-dimethyl-α,α-diphenyl-1-pyrrolidinebutyronitrile hydrochloride was added to the diluted acid with stirring. The mixture was heated on a steam bath for four hours with stirring, poured onto cracked ice, and made strongly alkaline (pH 9) by the addition of one liter of concentrated aqueous ammonium hydroxide. The separated gum solidified on standing, was isolated by filtration, and recrystallized from 500 mils of isopropanol to give a 72 percent yield of 2,2 - dimethyl - α,α - diphenyl-1-pyrrolidinebutyramide melting at 164–165 degrees centigrade and having the following analysis:

Calculated for $C_{22}H_{28}N_2O$: C, 78.53; H, 8.39; N, 8.33. Found: C, 78.35; H, 8.06; N, 8.21.

Following the procedure of Example 2 using other 2,2 - dimethyl - α,α - diphenyl - 1 - pyrrolidinealkanonitriles there are obtained other amides, such as, α,α-diphenyl-γ,2,2-trimethyl - 1 - pyrrolidinebutyramide, α,α-diphenyl-β,2,2-trimethyl - 1 - pyrrolidinebutyramide, 2,2-dimethyl-α,α-diphenyl-1-pyrrolidinecapramide, 2,2-dimethyl-α,α-diphenyl-1-pyrrolidinevaleramide, 2,2-dimethyl-α,α-diphenyl - 1 - pyrrolidinenanthamide, 2,2 - dimethyl-α,α-diphenyl-1-pyrrolidinecaprylamide, and the like.

Example 3.—2,2 - dimethyl - α,α - diphenyl - 1 - pyrrolidinebutyramide sulfate

To a slurry of 16.8 grams (0.05 mole) of 2,2-dimethyl-α,α-diphenyl-1-pyrrolidinebutyramide in 250 mils of ether was added a cold solution of 1.4 mils (0.025 mole) of 95.7 percent sulfuric acid in ten mils of isopropyl alcohol. The desired sulfate was filtered off and recrystallized from a methyl ethyl ketone-ethanol mixture. It had a melting point of 173–174 degrees centigrade and the following analysis:

Calculated for $C_{44}H_{58}N_4O_6S$: C, 68.54; H, 7.58; N, 7.27; S, 4.16. Found: C, 67.84; H, 7.77; N, 7.24; S, 4.22.

Following the procedure of Example 3, the sulfates of the other amides given above can be prepared. Also by the same or similar neutralization procedures, other acid addition salts of non-toxic acids, such as hydrochlorides, hydrobromides, phosphates, acetates, lactates, citrates, mandelates, benzoates, salicylates, tartrates, and the like, can be prepared. By the same procedure, the corresponding salts of the nitriles can be prepared.

Example 4.—2,2-dimethyl - α,α - diphenyl - 1 - pyrrolidinebutyramide methobromide A mixture of 20.0 grams (0.059 mole) of 2,2-dimethyl-α,α-diphenyl-1-pyrrolidinebutyramide and fifty grams of methyl bromide in 100 mils of dry benzene was allowed to stand for 65 hours at room temperature in a stoppered flask. The desired methobromide was filtered off as fine white crystals having a melting point of 230–233 degrees centigrade, and on recrystallization from an isopropanol-methanol mixture, 231–233 degrees centigrade.

Following the procedure of Example 4, the methobromides of the other amides given above as well as other non-toxic quaternary salts such as methiodides, methochlorides, ethiodides, ethobromides, ethosulfates, and the like, can be prepared. By the same procedure the corresponding salts of the nitriles can be prepared.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A new class of compounds having the formula:

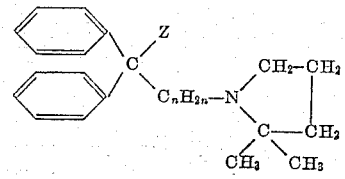

in which $n$ is an integer from one to six, inclusive, and Z is selected from the class consisting of the cyano and carbamyl groups.

2. 2,2 - dimethyl - α,α - diphenyl - 1 - pyrrolidinealkanoamides having from 21 to 26 carbon atoms, inclusive.

3. 2,2 - dimethyl - α,α - diphenyl - 1 - pyrrolidinealkanonitriles having from 21 to 26 carbon atoms, inclusive.

4. 2,2 - dimethyl - α,α - diphenyl - 1 - pyrrolidinebutyronitrile free base.

5. The methohalides of 2,2-dimethyl-α,α-diphenyl-1-pyrrolidinealkanoamides having from 21 to 26 carbon atoms, inclusive.

6. The methobromides of 2,2-dimethyl-α,α-diphenyl-1-pyrrolidinealkanoamides having from 21 to 26 carbon atoms, inclusive.

7. The methobromide of 2,2-dimethyl-α,α-diphenyl-1-pyrrolidinebutyramide.

8. 2,2 - dimethyl - α,α - diphenyl - 1 - pyrrolidinebutyramide free base.

References Cited in the file of this patent

UNITED STATES PATENTS

| | | |
|---|---|---|
| 2,405,555 | Bergel et al. | Aug. 13, 1946 |
| 2,446,803 | Bergel et al. | Aug. 10, 1948 |
| 2,446,804 | Bergel et al. | Aug. 10, 1948 |
| 2,555,354 | Lucas et al. | June 5, 1951 |
| 2,585,550 | Hoffmann et al. | Feb. 12, 1952 |
| 2,592,191 | Ruddy | Apr. 8, 1952 |
| 2,649,456 | Walter et al. | Aug. 18, 1953 |

OTHER REFERENCES

J. Org. Chem., vol. 17, pp. 407–13 and 770–777 (1952).

B. I. O. S. Final Report No. 116, item No. 24, p. 50.